(12) United States Patent
Lai

(10) Patent No.: US 6,318,572 B1
(45) Date of Patent: Nov. 20, 2001

(54) MULTIFUNCTIONAL KNOCKDOWN RACK STRUCTURE

(76) Inventor: Yung Lin Lai, No. 27, Lane 3, Kuo Kou Village, Ta Tsun, Hsiang Changhua County (TW)

( * ) Notice: Subject to any disclaimer, the term of this patent is extended or adjusted under 35 U.S.C. 154(b) by 0 days.

(21) Appl. No.: 09/620,072

(22) Filed: Jul. 20, 2000

(51) Int. Cl.⁷ .................................................. A47F 5/00
(52) U.S. Cl. ..................... 211/196; 211/205; 211/107; 108/147.12; 108/147.13
(58) Field of Search .................................. 211/107, 205, 211/196, 133.4; 248/158, 415, 230.1, 230.7; 403/235, 237, 245; 108/147.12, 147.13

(56) References Cited

U.S. PATENT DOCUMENTS

| | | | |
|---|---|---|---|
| 3,421,762 | * | 1/1969 | Paradise . |
| 3,547,275 | * | 12/1970 | Engel . |
| 3,765,343 | * | 10/1973 | Ettleiger et al. ...................... 108/106 |
| 4,678,089 | * | 7/1987 | Larg ................................. 211/205 X |
| 5,584,398 | * | 12/1996 | Lin ........................................ 211/40 |
| 6,113,042 | * | 9/2000 | Welsch et al. .................... 211/187 X |
| 6,123,206 | * | 9/2000 | Zaremba ............................... 211/107 |

* cited by examiner

*Primary Examiner*—Robert W. Gibson, Jr.
(74) *Attorney, Agent, or Firm*—Rabin & Berdo, P.C.

(57) ABSTRACT

The present invention discloses a multifunctional knockdown rack structure, mainly comprising a main shaft and a plurality of inserting members, wherein the main shaft forms by stamping a plurality of ring edges at many sections on the surface of the tube member of the main shaft; the inserting member has an opening with a diameter slightly smaller than that of the tube member of the main shaft, and forms an interior hollow that exactly fits into the ring edge, and there are a blocking section and a supporting section respectively at the upper end and lower end of the interior hollow that fit into the tube member of the main shaft. The upper end and lower end respectively fit in the blocking section and the supporting section; such supporting section is coupled to the interior hollow having a anti-pressure section at an appropriate distance (this section is one empty section having no restrictions). The anti-pressure section offers an unrestricted accommodation to the ring edges of the main shaft; as the ring edges slide into the interior hollow until they reach the blocking section, and such blocking section will tightly grasp the ring edge forming a tight coupling to the ring edge surface with the interior hollow. The supporting section at the lower end also tightly presses the external rim of the tube; such arrangement can fix the inserting members to the ring edge of the main shaft in position, and can achieve the purpose of being a multifunctional, all purpose, safe, and reliable assembly.

5 Claims, 7 Drawing Sheets

MULTIFUNCTIONAL KNOCKDOWN RACK STRUCTURE

BACKGROUND OF THE INVENTION

1. Field of the Invention

The present invention relates to a rack structure, and more particularly to a multifunctional knockdown rack structure.

2. Description of the Prior Art

Conventional racks sold in the market are generally divided into two types; the fixed rack and the knockdown rack. The fixed rack occupies lots of space during transportation, exhibition for sale, and storage (when not in use), and causes inconvenience; in contrast, the knockdown rack is composed of several component modules, and these modules are put together before use. Therefore, the knockdown rack does not have the problem of wasting space. Moreover, the knockdown rack is fast and efficiently mass produced, allows for DIY assembly by consumers, and allows for the easy replacement of defective modules. However, the currently existing racks such as the layered racks, clothes racks, and flower racks may have different shapes and forms of the structural designs, but all of them are restricted to a single function for their application. Therefore, when different racks gather in a room, it is a terrible scene, unless the users make some efforts to purchase a product similar to that of the present invention to resolve the problem of being conflict and inharmonic in vision. In general, it is relatively difficult or even impossible to seek for all kinds of different racks manufactured by the same company because there is no such manufacturer. Even if there is a manufacturer who makes all kinds of racks, their designs or styles may not be the same. Therefore, it is inevitable that the combination of the currently used racks look odd and terrible. In view of the above-mentioned shortcomings of the prior art, the inventor of the present invention based on years of experience accumulated from the engagement in the related industry conducted extensive research to resolve the foregoing shortcomings.

Therefore, the primary objective of the invention is to overcome the shortcomings of the conventional racks and to provide users a multifunctional knockdown rack structure that forms a ring edge each at a plurality of sections on the tube surface of the main shaft, and use the ring edge accommodator at the anti-pressure section of the inserting member to slide into the interior hollow. As the ring edge reaches the blocking section, the ring edge and the tube are tightly coupled at many points of locations; and such application for positioning the object by blocking and pressing and the composition of the knockdown rack is commonly used. A simple and convenient inserting member is used to control the positioning, and gives a fast, efficient, various way for the selective application, especially for those enhancing the convenience, applicability, and practicability of the knockdown rack.

To make it easier for our examiner to understand the objective of the invention, structure, innovative features, and performance, we use a preferred embodiment together with the attached drawings for the detailed description of the invention.

BRIEF DESCRIPTION OF THE DRAWINGS

Other objects, features, and advantages of the invention will become apparent from the following detailed description of the preferred but non-limiting embodiment. The description is made with reference to the accompanying drawings, in which.

DESCRIPTION OF THE PREFERRED EMBODIMENT

Figure 1:
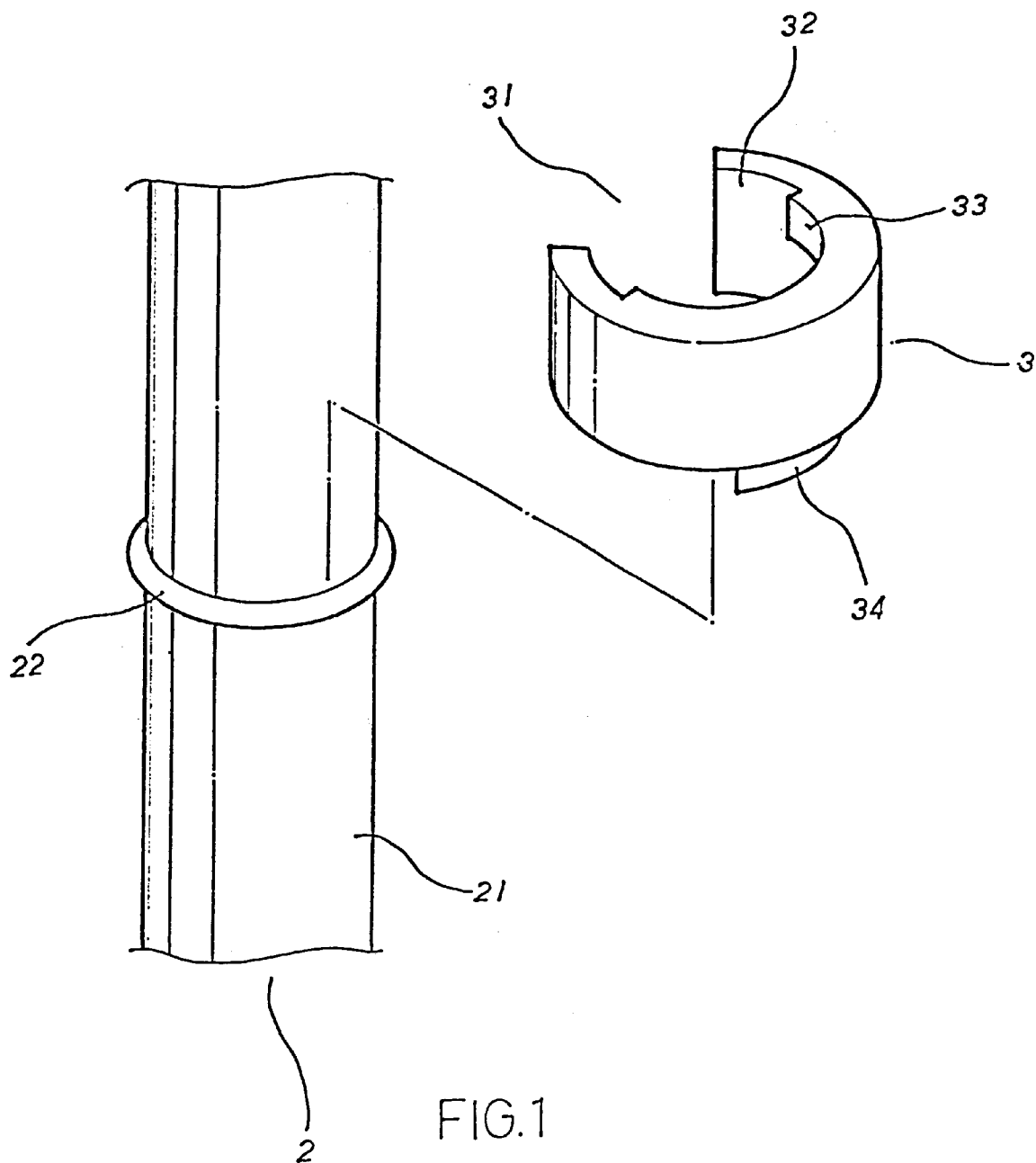
FIG. 1 shows the three-dimensional diagram of the disassembled parts of the present invention.
Figure 3:
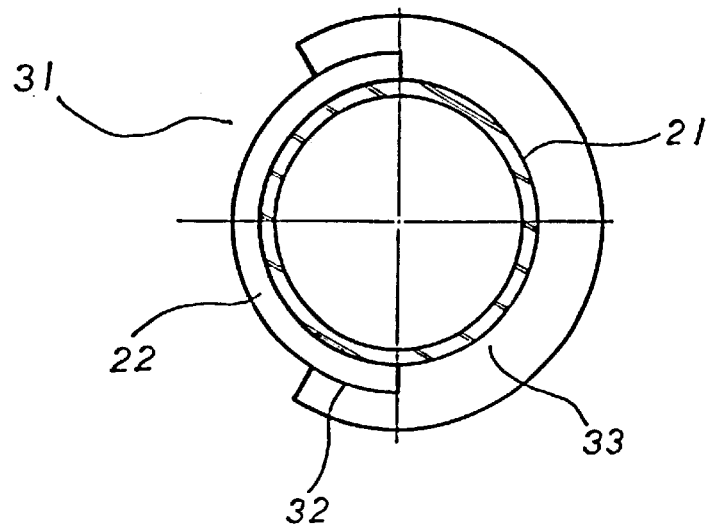
FIG. 3 shows an end-view diagram of the positioning of the structural assembly according to the present invention.
Figure 2:
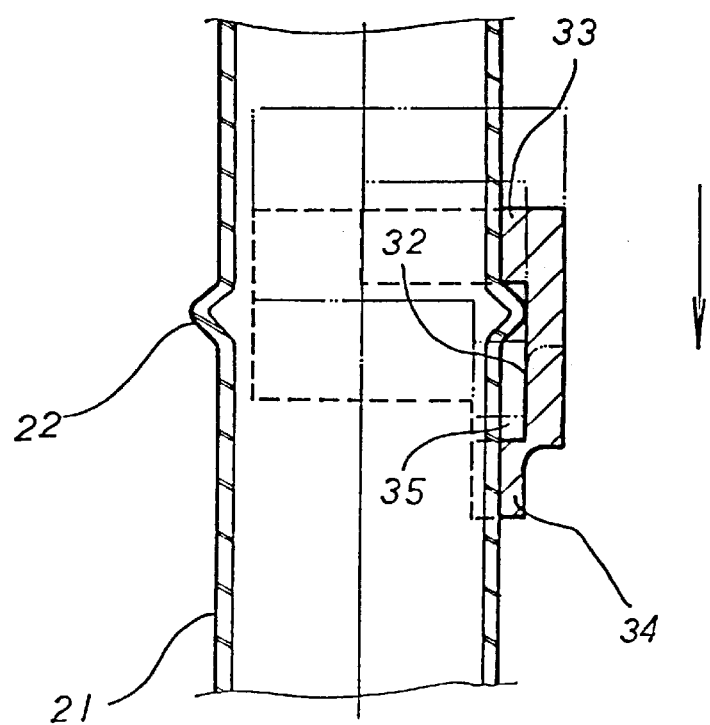
FIG. 2 shows the diagram of the positioning of the structural assembly according to the present invention.

Please refer to FIGS. 1 to 3. The present invention includes a main shaft 2 and a plurality of C-shaped inserting members 3. The main shaft 2 is formed by stamping a plurality of ring edges 22 at many sections on the surface of the tube member 21 of the main shaft 2. The inserting member 3 has an opening 31 with a diameter slightly smaller than that of the tube member 21 of the main shaft, and forms an intermediate section with an interior hollow 32 that has a radius of curvature similar to the ring edge, so as to exactly fit around the ring edge 22. There is a blocking section 33 and a supporting section 34 respectively at the upper end and lower end of the interior hollow 32 that fit around the tube member 21 of the main shaft. The upper end and lower and respectively fit in the blocking section and the supporting section. The supporting section is coupled to the interior hollow having a anti-pressure section 35 at an appropriate distance. By the assembly of the foregoing components, the anti-pressure section 35 offers an unrestricted accommodation to the ring edges 22 of the main shaft. The ring edges 22 slide into the interior hollow 32 until they reach the blocking section 33, and such blocking section 33 will tightly grasp the ring edge 22 forming a tight coupling to the ring edge surface with the interior hollow. The supporting section 34 at the lower end also tightly presses the external rim of the tube 21; such arrangement can fix the inserting members to the ring edge of the main shaft in position for the knockdown rack. The assembly is as shown in FIGS. 2 and 3.

Figure 4:
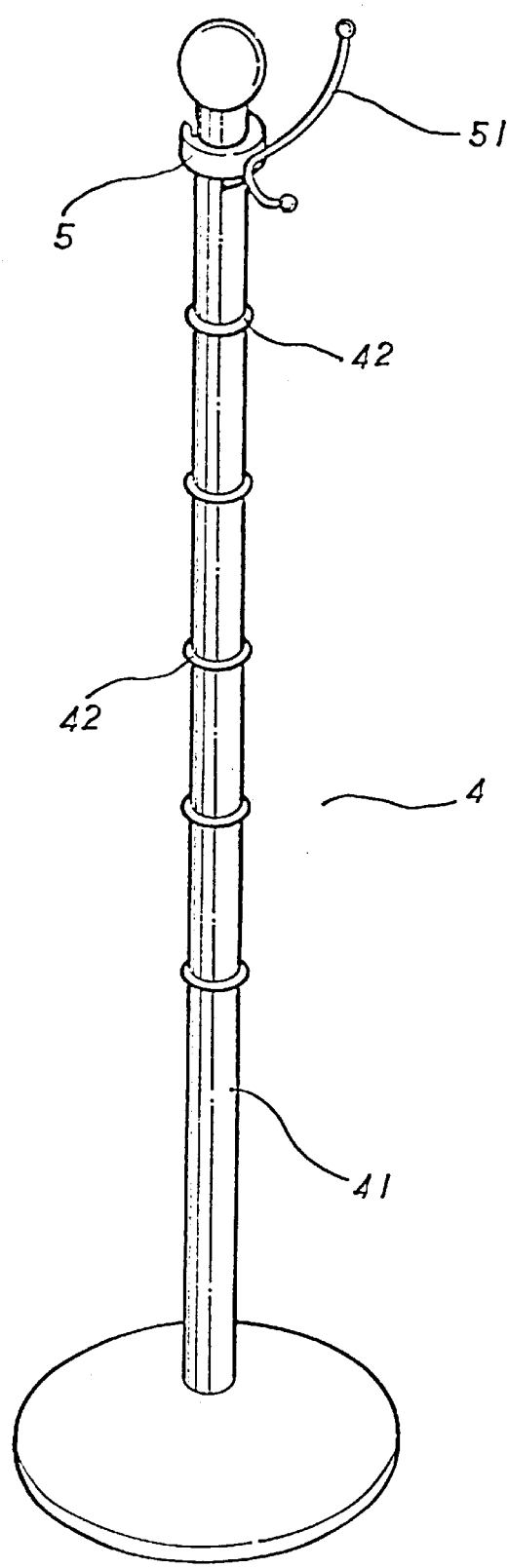
FIG. 4 shows the application of an embodiment of the present invention.
Figure 5:
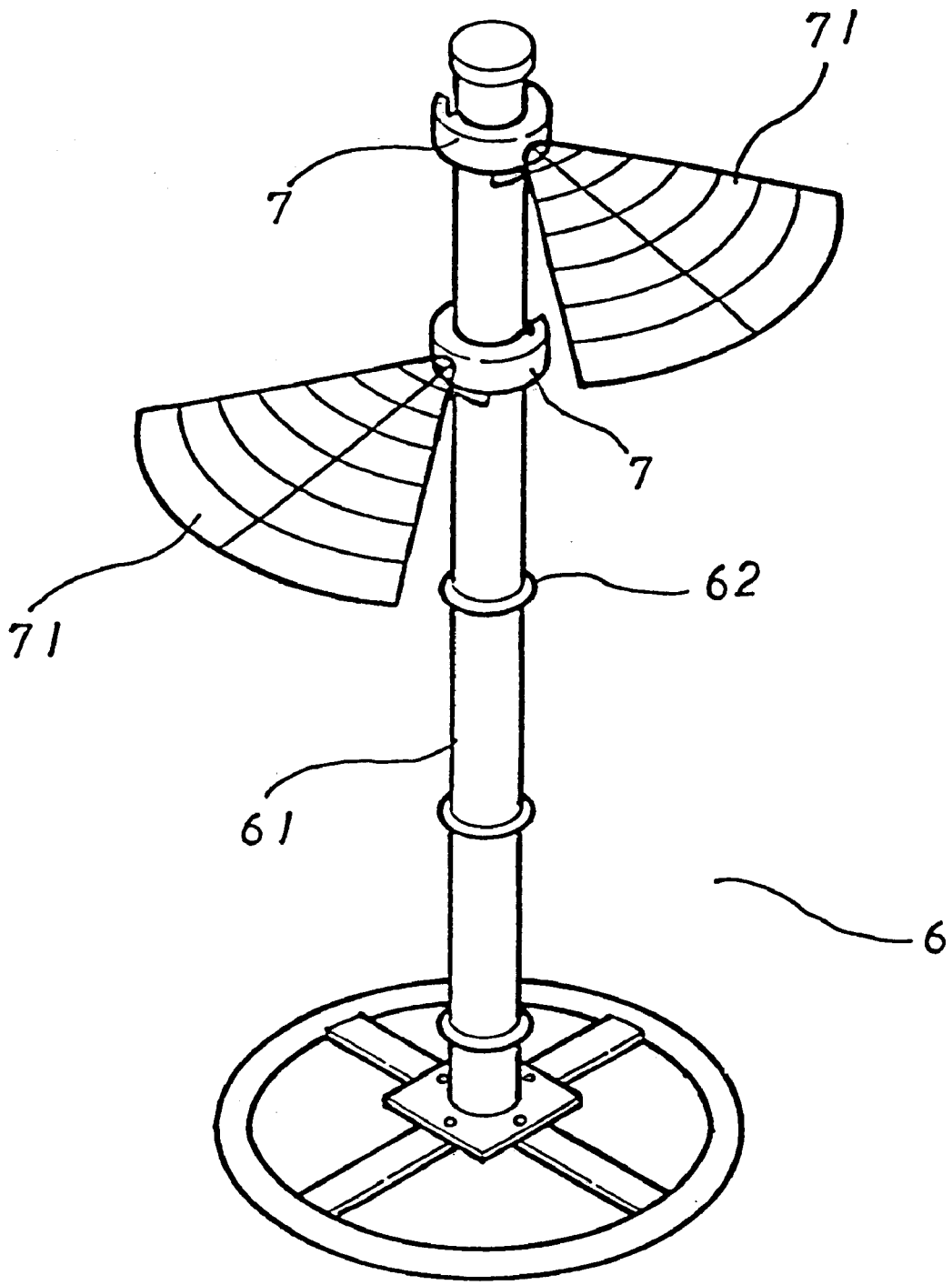
FIG. 5 shows the application of another embodiment of the present invention.
Figure 6:
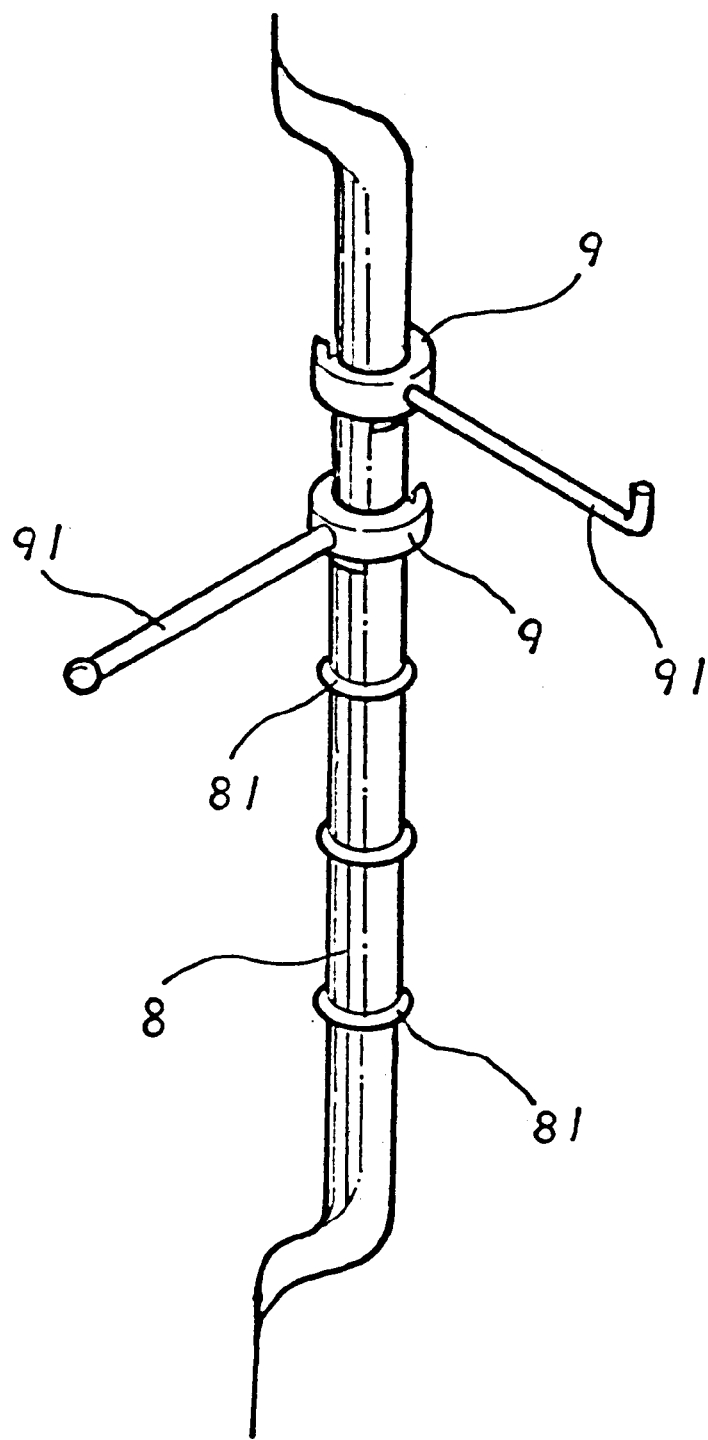
FIG. 6 shows a further application of another embodiment of the present invention.

Furthermore, as shown in FIGS. 4, 5, and 6, the stand 41 of a coat rack 4 forms a ring edge 42 at many sections of the stand, and such ring edges will cope with the same number or different number of inserting members as needed for its assembly to hang coats. The application of the assembly of the coat rack 4 is as shown in FIG. 4. As the supporting rod 61 of the flower rack 6 of the present invention has several sectional ring edges 62, and such ring edge 62 will cope with the same number or different number of the inserting members in the form of placement nets as needed for its assembly to put flowers (refer to FIG. 5). In addition, the present invention also forms many sectional ring edges 81 on the main hooking body 8, and such ring edge 81 will cope with the same number or different number of the inserting members 9 in the form of hangers 91 as needed for its assembly to hang flowers along the walls, as shown in FIG. 6. Therefore, the present invention is also applicable to a layered rack or other different kinds of racks, having multifunctional applications.

Figure 7:
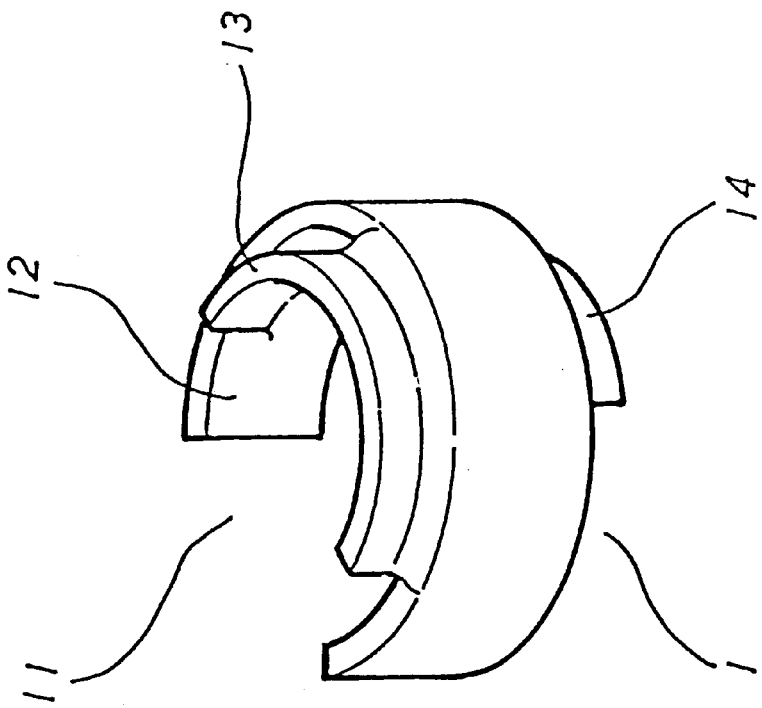
FIG. 7 shows the three-dimensional formation diagram of an inserting member according to the present invention.
Figure 8:
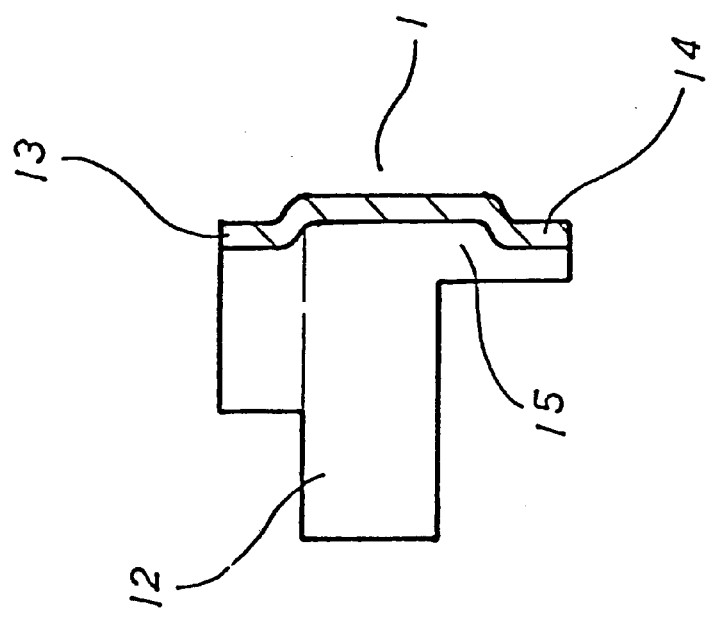
FIG. 8 shows the detailed structural diagram of another inserting member according to the present invention.
Figure 10:
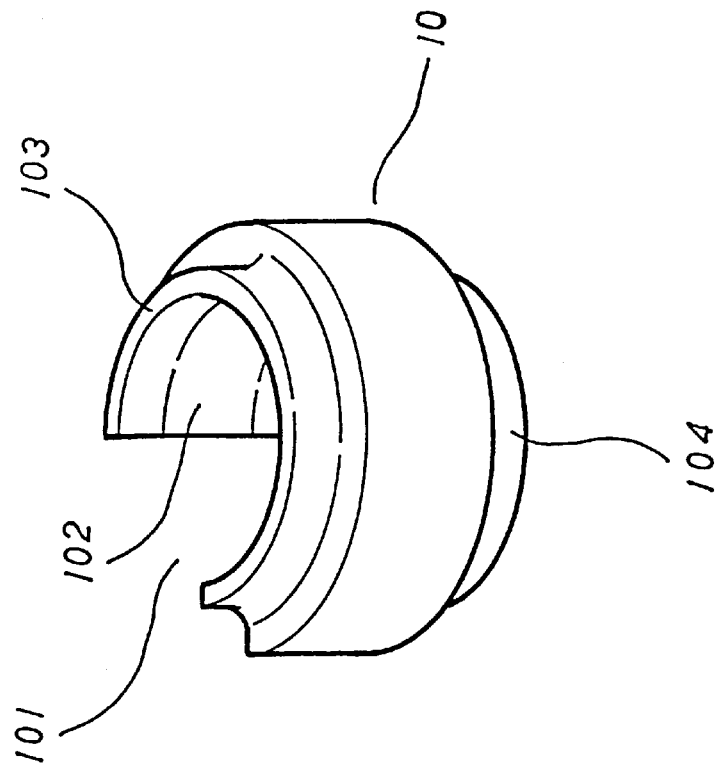
FIG. 10 further shows the detailed structural diagram of another inserting member according to the present invention.
Figure 9:
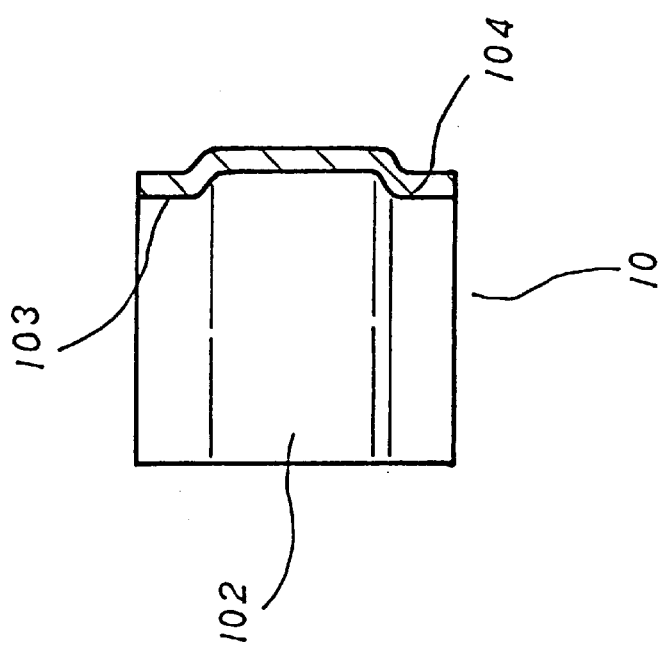
FIG. 9 further shows the three-dimensional formation diagram of another inserting member according to the present invention.

Furthermore, in FIGS. 7 and 8, the present invention is a one-piece with the inserting member 1 formed by direct patterning and stamping metallic plates. It also has an opening 11 with a diameter slightly smaller than that of the tube member 21 of the main shaft, and forms an interior hollow 12 that exactly fits into the ring edge 22, and there are a blocking section 13 and a supporting section 14 of the main tube member 21 respectively at the upper end and lower end of the interior hollow 12 that fit into the tube member 21 of the main shaft. By an anti-pressure section 15 coupling to the supporting section 14 and the interior hollow 12, simplify manufacturing process and reduce production cost. Furthermore, in FIGS. 9 and 10, the present invention levels the blocking section 103 at the upper end of the inserting member 10 with the supporting section at the lower end, and having an opening 101 on its lateral side which has a diameter larger than the main tube member 21, and it exactly fits into the interior hollow 102 of the ring edge. By directly inserting the opening 101 onto the main shaft 21, the blocking section 103 or the supporting section 104 presses the ring edge 22 and acts as a stopper for the positioning, and it has the function for the application of a bi-directional blocking hook.

In view of the descriptions above, the present invention is innovative and more advantageous than the conventional prior air. It significantly enhances the applicability of the conventional racks, and features a multifunctional application, easy-to-assemble, and secure because of the controlling structure having the fixed-point coupling and selective positioning; it surely complies with the patent application requirements. Hence the present invention is submitted to the Patent and Trademark Office for review and the granting of the commensurate patent.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A multifunctional a knockdown rack structure, comprising:

a main shaft having a tubular member and a plurality of rings integrally formed on a surface of said tubular member, said rings being formed in different axially-disposed locations; and a plurality of C-shaped inserting members positionable around said tubular member and engagable with a respective ring, each said inserting member including:

an intermediate section disposable around the respective ring, the intermediate section having an inner surface having a radius of curvature that is essentially the same as a radius of curvature of the respective ring so that when the intermediate section is disposed around the respective ring, the ring freely fits within a hollow space of said intermediate section;

a blocking section disposed at an upper portion of said intermediate section, said blocking section projecting inwardly beyond the inner surface of the intermediate section so that when the intermediate section is disposed around the respective ring, the blocking section is disposed above and abuts against the respective ring, to prevent said inserting member from sliding downward along said tubular member; and a supporting section disposed at a lower portion of said intermediate section, said supporting section projecting inwardly beyond the inner surface of the intermediate section so that when the intermediate section is disposed around the respective ring, the supporting section is disposed below the respective ring and tightly presses the outer surface of said tubular member to support said inserting member against said tubular member.

2. The multifunctional knockdown rack structure according to claim 1, wherein each said inserting member has an opening deposed at a lateral side thereof to define the C-shape, the opening being smaller than a diameter of said tubular member, the opening communicating with the hollow space to allow said inserting member to be disposed around said main shaft.

3. The multifunctional knockdown rack structure according to claim 1, wherein said inserting members and said main shaft are each of a one-piece construction.

4. The multifunctional knockdown rack structure according to claim 3, wherein said inserting members and said main shaft are each formed of metal.

5. The multifunctional knockdown rack structure according to claim 1, wherein said blocking section and said supporting section, of each respective inserting member, each has an opening in alignment with each other.

* * * * *